May 22, 1934.  P. DE L. PATTERSON  1,959,596
FLASH LIGHT TIMING DEVICE FOR CAMERAS
Filed Feb. 23, 1933

INVENTOR.
PHILIP DE L. PATTERSON
BY Lincoln Johnson
ATTORNEY

Patented May 22, 1934

1,959,596

UNITED STATES PATENT OFFICE 1,959,596

FLASH-LIGHT TIMING DEVICE FOR CAMERAS

Philip De L. Patterson, San Francisco, Calif.

Application February 23, 1933, Serial No. 658,123

3 Claims. (Cl. 67—29)

My invention relates to synchronizing mechanisms adapted for use in connection with the photo-cameras and flashlights.

The present practice of taking a picture with a flashlight consists of opening the shutter of the photo-camera, flashing the light and closing the shutter. A certain amount of light always gets into the camera before and after the flashlight operates, while the shutter is open, and mars the picture to a certain extent. The flashlight may also lead the opening of the shutter to such an extent that the purpose would be defeated.

It is the object of this invention to provide a synchronizing mechanism by means of which the operation of the camera shutter and the flash of the light, can be made in exact timed relationship, to accomplish maximum illumination of the subject being photographed at maximum opening of the shutter.

Another object of my invention is to provide a synchronizing means for flashlights and photo-cameras, immediately connected with the shutter operable means, thereby assuring positive, accurate and simultaneous action of both.

Another object of my invention is to provide camera mechanism which permits the use of exposures of different duration at the will of the operator, in synchronized relation with a flashlight.

Other objects and advantages are to provide a flashlight timing device for cameras that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

My invention is illustrated in the accompanying drawing in which

Figure 1:
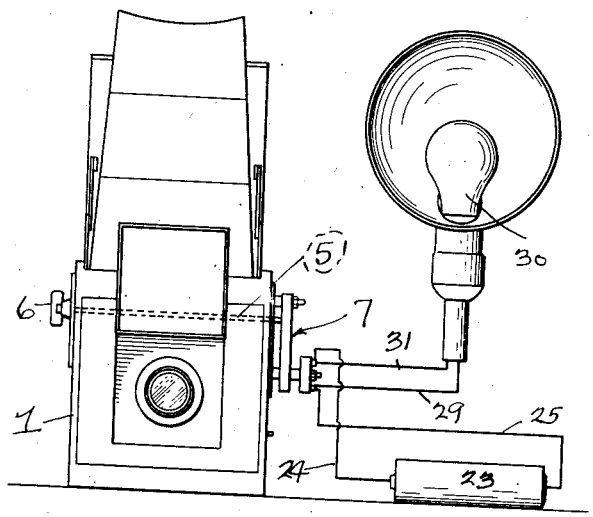
Fig. 1 shows a front view of a camera, a flashlight, a battery and electrical connection therebetween.
Figure 2:
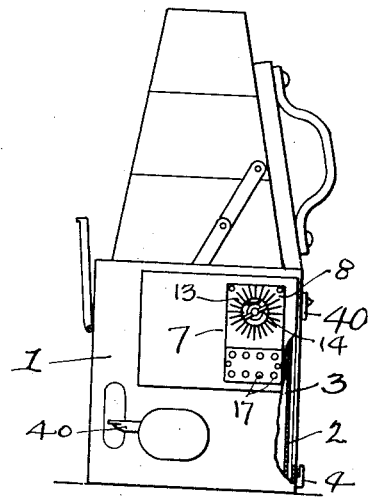
Fig. 2 is a side view of a camera, a part thereof being broken away, showing a synchronizing mechanism constructed in accordance with my invention applied thereto.

In the drawing, my synchronizing mechanism is shown as applied to a photo camera, known as a "Graflex Camera". It will be understood that my invention may be applied equally as well to the shutter of any other camera.

The camera 1 is equipped with a standard plane shutter in the form of a curtain 2, having several successive openings 3 of different widths. The camera is so constructed that during the exposure, one of these openings flashes across the film (not shown) supported by brackets 4, admitting the rays of light that represent the picture. The curtain 2 is wound up by means of the knob 6 on the shaft 5 extending across the camera. The curtain 2 is operated by means of a spring (not shown) which can be wound to any of six tensions for selecting the width of the opening in the curtain, and the tension of the spring produces a number of speed combinations varying from one tenth to one thousandth of a second.

The type of camera shown in the drawing is the well known commercial Graflex type, the operation of which is old and well known in the art, and a detailed description thereof will not be entered into except in so far as necessary to disclose the mode of operation of my invention. In this type of camera, a mirror (not shown) normally occupies a position extending across the sight opening, and the shutter is back of said mirror, and is released only when this mirror has reached a horizontal position so as to leave a clear field between the shutter and the lens. The shutter is set by means of the knob 6 on the shaft 5, and the mirror by means of a lever (not shown), said knob and said lever being carried by a plate on the same side of the camera. A trip mechanism (not shown) is actuated upon the limit of the swinging movement of the lever to release the shutter mechanism, hence the mirror operating lever is operative upon the shutter trip mechanism only toward the limit of this movement, or when the mirror has reached a substantially horizontal position. The mirror is held in the inclined position across the sight opening by a latch, controlled by a press button, neither of which mechanisms are shown in the accompanying drawing as they are old and well known in this art. With this type of camera, no exposure can be made until the mirror has been raised, and when the mirror has once been raised, the shutter curtain with the sight slots therein, operates under its own spring which is independent of any other mechanism in the camera. The shutter curtain has five sight openings therein, and a spring which actuates the shaft on which the shutter curtain is mounted, may be placed under any one of six tensions, thereby producing twenty-four speed combinations. The mechanism for regulating the speed of the shutter curtain forms no part of the present invention, the same being standard equipment on a Graflex camera.

In standard Graflex cameras, the right (looking at Fig. 1) end of the curtain or shutter winding shaft terminates in the side wall of the camera. I provide a shaft 5 which extends across the width of the camera and terminates in a synchronizing mechanism 7.

This mechanism comprises an insulating plate 8 attached to a metal plate 9 on the camera, by means of the bolts 10. A circular opening 12, the center of which coincides with the center of the shaft 5, is cut in the plate 8. A number of contacts 13 are spaced radially around the circumference of the opening. The protruding end of the shaft 5 carries a contact bar 14 which is adapted to engage the contacts 13 when the shaft 5 is rotated.

The plate 8 carries a small insulating plate 16 in front thereof on which plate a number of sockets 17 are arranged, said sockets being in electrical connection with the contacts 13 by means of the wires 18. Sockets 20 and 21, also carried by the plate 16, are connected by the wire 22, the socket 20 being adapted to be connected to a source of electrical energy 23 by means of a wire 24, and a wire 25 connects the other pole of the energizing unit with one of the sockets 17. The current is thus transmitted to the plate 9 and therefrom by means of a spring finger 28, riding upon the shaft 5, to the contacting bar 14. The socket 21 is adapted to be connected by means of a wire 29 to a flashlight 30. A wire 31 returns from the flashlight to be plugged into any one of the sockets 17. The moment the bar 14 touches a predetermined contact 13, the electrical circuit is completed and the light flashes. Each opening 3 in the curtain 2 corresponds to a certain socket 17 on the plate 16.

Figure 3:
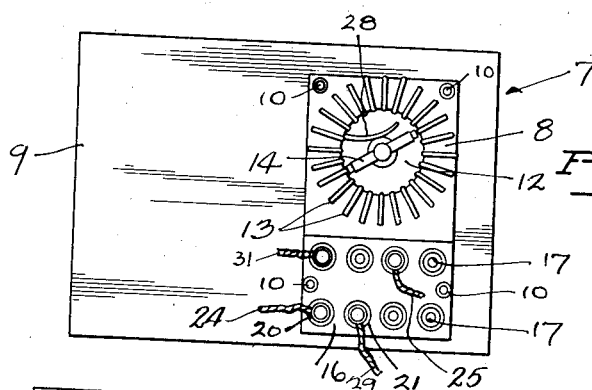
Fig. 3 is an enlarged front view of my synchronizing mechanism.
Figure 4:
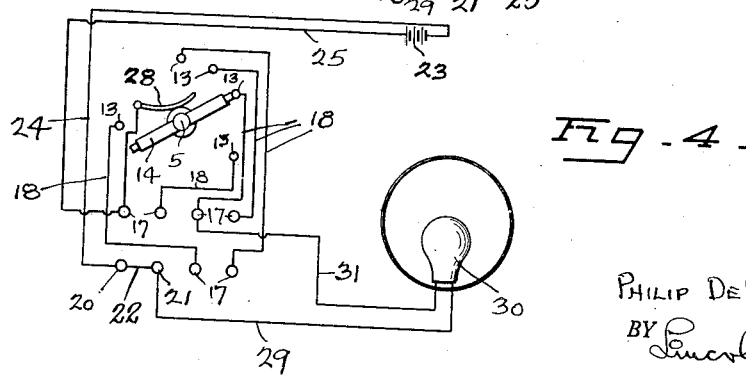
Fig. 4 is an electrical wiring diagram.

In the drawing I have shown twenty-four contacts 13, of which contacts only five are connected to the contacts 17, the remaining contacts forming a surface over which the ends of the contactor bar 14 may pass. Twenty-four contacts 13 are shown enabling a selective choice of any five of the contacts to be made to properly corelate the flash of the lighting medium with any selected sight opening in the shutter curtain. The contactor bar 14 makes a half turn with each movement of a sight opening in the shutter curtain past the lens. The contactor bar 14 assumes the same normal position of rest at all times. The five live contacts 13 shown in Fig. 3 are spaced varying distances away from the normal position of rest of the conductor bar so that by plugging into any selected pair of sockets 17, it is possible to time the flash at any desired interval in relation to the movement of the shutter curtain past the lens. The nineteen dummy contacts 13 form a continuation of the live contacts and provide an uninterrupted surface with which the ends of the contactor bar 14 may contact.

The duration of the flash is about one fiftieth of a second. As the time of exposure may be varied from one thousandth to one tenth of a second, it is evident that the operator has a wide choice of exposures, from one fiftieth to one thousandth of a second, which he may use at his will.

The operation of the device is as follows: The camera is properly set up and loaded; the battery is connected to the sockets 17 and 20. One of the flashlight wires is connected to the socket 21. The time of exposure is chosen and the curtain is properly wound and set. The other wire 31 of the flashlight is then connected to the contact 17, corresponding to the selected shutter opening, and the camera is ready for action. When the curtain release 40 is pressed, the shaft 5 rotates, simultaneously actuating the curtain and the contacting bar 14, which contacts energized contact 13 and flashes the light.

The synchronization of the movement of the curtain and the shaft of the light is made with exactness regardless of the extremely small duration of the exposure and the flash.

The use of the curtain shaft 5 for carrying a contacting means for the flashlight circuit, does away with any intermediate mechanism therebetween, assures perfect timing and positiveness of operation, and renders impossible future discrepancies between the action of the curtain and the flashlight on account of wear.

The connection between the sockets 17 and certain selected contacts 13 permit the flash of the flashlight to be had at any selected interval. When an exposure on the camera film is to be made, the shutter curtain is placed under spring tension and the contactor bar 14 on the rod 5, which is related to the shutter curtain, assumes a normal position of rest. The contacts 13 are spaced varying distances away from the normal position of rest of the contactor bar. The spacing of the contact elements 13 determines the interval at which the light will flash, that is the time interval with which the flash of the light will lead the movement of the opening in the shutter curtain past the focal plane. When the shutter curtain is released, the conductor bar 14 starts to move in unison therewith, and the light will be flashed either immediately, or at an interval of time thereafter, depending upon which of the contacts 13 are connected in circuit with the light. A quick flash will be had if the flashlight is connected to one of the contacts next adjacent the normal position of rest of the contactor bar, and a relatively slower flash will be had when the flashlight is connected to one of the contacts 13, which are some distance removed from the normal position of rest of the contactor bar.

Certain of the contacts 13 may also correspond to certain selected openings in the shutter curtain, so that the light will flash in timed relation to a selected shutter opening.

Having thus described this invention, what I claim and desire to secure by Letters Patent is:

1. In combination with a camera including a focal plane shutter curtain having openings therein; a shaft related to the curtain to regulate the speed at which a selected opening in the shutter curtain will move by the focal plane; means to release the shaft to permit movement of the shutter curtain past the focal plane; a contactor bar on said shaft; a series of independent contacts adapted to be contacted by rotation of said contactor bar; a flashlight; and an electrically energized circuit connected to said contactor bar, flashlight, and selected contacts, whereby said light will be flashed in timed relation to the movement of an opening in the shutter curtain past the focal plane.

2. In combination with a camera including a focal plane shutter curtain having openings therein; a shaft related to the curtain to regulate the speed at which a selected opening in the shutter curtain will move by the focal plane; means to release the shaft to permit movement of the shutter curtain past the focal plane; a contactor bar on said shaft; a series of contacts arranged in spaced circumferential relation around said contactor bar to be contacted upon rotation of said bar synchronously with the movement of the shutter curtain; a flashlight connected to selected contacts; and an electric circuit including connections to the contactor bar, contacts and flashlight.

3. In combination with a camera including a focal plane shutter curtain having openings therein; a shaft related to the curtain to regulate the speed at which a selected opening in the curtain will move by the focal plane; means to release the shaft to permit movement of the shutter curtain past the focal plane; a contactor bar on said shaft having an initial position of rest corresponding to the position of the shutter curtain prior to its release; a series of independent contacts adapted to be contacted by said bar upon rotation thereof arranged varying distances from the initial position of rest of the contact bar; a flashlight connected to selected contacts to flash a predetermined period of time after said contactor bar leaves its initial position of rest; and an electric circuit including connections to the contactor bar, contacts and flashlight.

PHILIP DE L. PATTERSON.